Patented Dec. 28, 1937

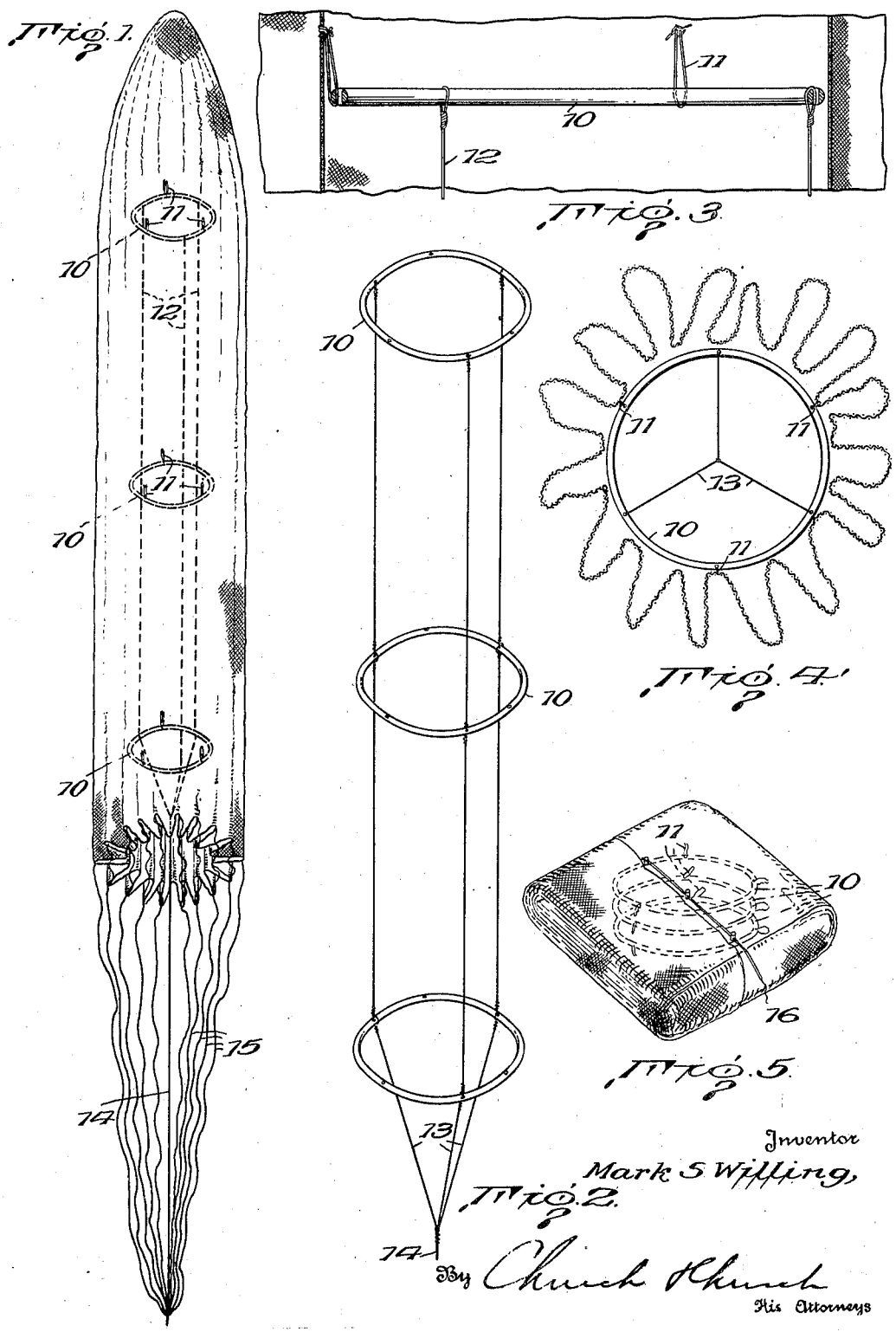

2,103,806

UNITED STATES PATENT OFFICE 2,103,806

PARACHUTE

Mark S. Willing, Mount Holly, Va.

Application November 3, 1936, Serial No. 109,035

4 Claims. (Cl. 244—149)

This invention relates to improvements in parachutes and has for its primary object the provision of a device of this character which will be certain of opening when released for the purpose of making a descent therewith.

Another object is the provision of what might be termed opening instrumentalities that may be produced cheaply and which will be certain of operation at all times regardless of their age. In other words, the means proposed by the present invention for insuring the opening of the parachute will not be detrimentally affected by age or weather conditions.

A still further object of the invention is to provide opening instrumentalities which can be readily packed within the interior of the canopy of the parachute when the latter is collapsed and stored in the ordinary pack.

Another object contemplated by the present invention is the provision of opening instrumentalities in the form of a plurality of members or elements adapted to be successively withdrawn from the free edge of the parachute to partially distend the same when the canopy is released for opening, the several elements being provided with spacing means so that after one member has been withdrawn and the edge or skirt portion of the canopy has been partially inflated, the successive members will aid in rendering the upper portion of the canopy more accessible to the air currents.

With these and other objects in view, the invention consists in certain details of construction and combinations and arrangements of parts, all as will hereinafter be more fully described, and the novel features thereof particularly pointed out in the appended claims.

In the accompanying drawing illustrating the preferred embodiment of the invention—

Figure 1 is an elevational view of a parachute canopy and the shroud lines, the opening elements being shown in dotted lines;

Fig. 2 is a perspective view of the several opening members removed from the canopy;

Fig. 3 is a sectional view taken longitudinally of the canopy illustrating the attachment of the opening members to the interior of the canopy and the connecting means for the several opening members;

Fig. 4 is a plan view looking into the interior of the canopy before the same has been fully inflated for the purpose of showing the partial distention of the canopy by one of the opening members; and Fig. 5 is a perspective view of a parachute pack, the opening instrumentalities being shown in dotted lines.

In accordance with the present invention, a number of members, each adapted to partially distend the parachute canopy, particularly at the free edge portion thereof, are packed within the canopy when the latter is collapsed for purposes of storage. These members are each so formed as to permit the passage of air therethrough. For instance, they may be in the form of thin, rigid, annular or ring-like members 10 and, in the preferred arrangement they are detachably secured to the interior surface of the canopy. As shown in Figs. 1 and 3, they may be secured to the interior of the canopy by comparatively light threads 11. Any form of connection that may be readily ruptured or broken to permit complete withdrawal of the rings from the interior of the canopy will suffice. The several members or rings are secured together by flexible connections 12 and extending from the lowermost ring member are lines 13 which merge into, or are attached to, a rope or other member 14 which may, if desired, constitute the load line of the parachute.

Attached to the free edge portion or skirt of the canopy are the usual shroud lines 15, whose lower ends are preferably secured to the load line 14. However, the length of the shroud lines 15 is such that the load line 14 and connecting lines 13 will be drawn taut before the shroud lines are placed under tension. As a result, when an individual makes a descent with the parachute, his weight suspended on the load line, after the rip cord 16 of the pack has been pulled and the parachute released, will first pull the load line and connecting lines 13 taut, whereupon the lowermost ring member 10 will be broken loose from the interior of the parachute. The length of connecting members 12 may be such that they will, at the same time, be drawn taut, and the several rings be broken loose substantially simultaneously, or the length of such lines 12 may be such that the rings will be successively detached from the canopy. In either event, the series of rings will be withdrawn successively from the free edge of the canopy. As the lowermost ring emerges from the free edge of the canopy, the same will be partially distended and, air being free to flow through the ring, the lowermost portion of the canopy, at least, will become inflated. Likewise, the succeeding ring members will insure either, first, the canopy remaining partially distended to facilitate entry of air into the same, or, depending upon the rate of movement of the ring members, they will facilitate entry of the air into the upper regions of the canopy.

It will be appreciated that the line or rope by which the ring members are extracted or withdrawn from the canopy need not constitute the load line of the device, in which event the relative length of the shroud lines will be immaterial. It will also be clear that the members 10 need not necessarily take the form of rings. It is only necessary that they be so formed as to permit the free passage of air therethrough and, of course, it is desirable that they be comparatively thin, in order to permit storing of the collapsed parachute in the least possible space. As previously described, they must be rigid, in order to insure partial distention of the canopy. Preferably, they are made of a comparatively light metal alloy.

What I claim is:

1. In a parachute, a canopy, a plurality of rigid annular members, means detachably securing said members in the interior of the canopy, said members being of less diameter than the canopy when the latter is distended and said securing means being capable of being ruptured to free said members from the canopy, connecting elements between each two juxtaposed members, and means for successively removing said members from the free edge of the canopy when the latter is released for opening.

2. In a parachute, a canopy, a plurality of rigid annular members, severable means detachably connecting said members at spaced points to the interior surface of the canopy, said members being of less diameter than the canopy when the latter is inflated whereby they may be packed within the canopy when the latter is collapsed, and means for successively wholly withdrawing said members from the free edge of the canopy when the latter is released for opening, said members being entirely disconnected from the canopy when withdrawn.

3. In a parachute, a canopy, a plurality of rigid members, means detachably securing said members at spaced points to the interior surface of the canopy, said members being of less diameter than the canopy when the latter is distended and said securing means being severable by the weight of the load suspended from the parachute, and means for wholly withdrawing said members from the free edge of the canopy when the latter is released for opening, said members being formed to permit the passage of air therethrough whereby entry of air to the interior of the parachute is augmented.

4. In a parachute, a canopy, a rigid annular member of less diameter than the canopy when the canopy is inflated whereby said annular member can be packed in the canopy when the latter is collapsed, severable means detachably securing said annular member to the interior surface of the canopy, said annular member being wholly detachable from the canopy by rupturing said securing means, and means for wholly withdrawing the annular member, when detached, from the free edge of the canopy when the latter is released for opening.

MARK S. WILLING.